(12) United States Patent
Lange

(10) Patent No.: US 9,080,348 B2
(45) Date of Patent: Jul. 14, 2015

(54) SYSTEMS AND METHODS FOR LOCK NOTIFICATION

(71) Applicant: GM GLOBAL TECHNOLOGY OPERATIONS LLC, Detroit, MI (US)

(72) Inventor: Richard J. Lange, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 13/866,992

(22) Filed: Apr. 19, 2013

(65) Prior Publication Data

US 2014/0313024 A1 Oct. 23, 2014

(51) Int. Cl.
*B60Q 1/00* (2006.01)
*E05B 39/00* (2006.01)
*B60R 25/04* (2013.01)
*B60R 25/24* (2013.01)

(52) U.S. Cl.
CPC .............. *E05B 39/00* (2013.01); *B60R 25/04* (2013.01); *B60R 25/245* (2013.01)

(58) Field of Classification Search
CPC .............................. B60R 25/04; B60R 25/245
USPC ............ 340/438, 435, 426, 426.36, 692, 901, 340/5.1, 5.64, 5.72
See application file for complete search history.

(56) References Cited

U.S. PATENT DOCUMENTS

| | | | |
|---|---|---|---|
| 4,942,349 A | 7/1990 | Millerd et al. | |
| 4,996,515 A * | 2/1991 | Schaffer et al. | 340/426.23 |
| 5,059,877 A | 10/1991 | Teder | |
| 5,508,595 A | 4/1996 | Schaefer | |
| 6,075,454 A * | 6/2000 | Yamasaki | 340/5.61 |
| 6,137,404 A | 10/2000 | O'Connor | |
| 6,297,731 B1 | 10/2001 | Flick | |
| 6,922,622 B2 | 7/2005 | Dulin et al. | |
| 7,170,419 B2 * | 1/2007 | Masui | 340/692 |
| 7,180,454 B2 * | 2/2007 | Asakura et al. | 343/713 |
| 7,482,773 B2 | 1/2009 | Heyn | |
| 7,819,442 B2 * | 10/2010 | Ieda et al. | 292/336.3 |
| 7,928,837 B2 | 4/2011 | Drew et al. | |
| 8,827,027 B2 | 9/2014 | Syvret et al. | |
| 2002/0143452 A1 | 10/2002 | Losey | |
| 2003/0098781 A1 * | 5/2003 | Baset | 340/5.72 |
| 2004/0080403 A1 | 4/2004 | Eshel | |
| 2007/0109785 A1 | 5/2007 | Wittorf et al. | |
| 2007/0203618 A1 | 8/2007 | McBride et al. | |

(Continued)

FOREIGN PATENT DOCUMENTS

JP 2000-045593 * 2/2000 ............. E05B 49/00

OTHER PUBLICATIONS

Washington, Brandon L., et al, US Patent Application entitled "Systems and Methods for Location Based Customization," filed on Apr. 19, 2013.

(Continued)

*Primary Examiner* — Tai T Nguyen
(74) *Attorney, Agent, or Firm* — Ingrassia Fisher & Lorenz, P.C.

(57) ABSTRACT

Methods and apparatus are provided for notifying an operator that a door of a vehicle is locked. The method can include receiving a request to lock a lock associated with the door, and determining an ambient lighting condition associated with the vehicle. Based upon the ambient lighting condition, outputting audible data, visual data or both audible data and visual data to indicate that the door is locked.

17 Claims, 3 Drawing Sheets

(56) References Cited

U.S. PATENT DOCUMENTS

2007/0255468 A1 11/2007 Strebel et al.
2008/0046251 A1 2/2008 Agapi et al.
2009/0069984 A1 3/2009 Turner et al.
2010/0268424 A1 10/2010 Binfet et al.
2013/0275008 A1 10/2013 Breed

OTHER PUBLICATIONS

USPTO, Office Action for U.S. Appl. No. 13/866,999 mailed Mar. 2, 2015.

* cited by examiner

SYSTEMS AND METHODS FOR LOCK NOTIFICATION

TECHNICAL FIELD

The present disclosure generally relates to vehicles and more particularly relates to systems and methods for notification that one or more doors associated with the vehicle are locked.

BACKGROUND

Typically, a vehicle can include a cabin, which can have one or more doors to gain entry to the cabin. Generally, each of the doors can have a door lock, which can be actuated to secure the cabin of the vehicle. In certain instances, the door locks can be actuated by a remote device.

Accordingly, it is desirable to provide systems and methods to notify the operator that the doors have been locked when using a remote device. Furthermore, other desirable features and characteristics of the present invention will become apparent from the subsequent detailed description and the appended claims, taken in conjunction with the accompanying drawings and the foregoing technical field and background.

SUMMARY

An apparatus is provided for a lock notification system for a vehicle having a cabin. The apparatus can include a door coupled to the cabin and including a lock that is actuatable to secure the door to the cabin. The apparatus can also include an ambient conditions sensor that generates a first signal that indicates an amount of light surrounding the vehicle, and a control module that receives the first signal and a request to actuate the lock. The control module can output audible data or audible data and visual data to indicate that the lock is locked when the vehicle in daylight, and output only visual data to indicate that the lock is locked when the vehicle in darkness.

A method is provided for notifying that a door of a vehicle is secured to a cabin of the vehicle. The method can include receiving a request to lock a lock associated with the door, and determining an ambient lighting condition associated with the vehicle. Based upon the ambient lighting condition, outputting audible data, visual data or both audible data and visual data to indicate that the door is locked.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
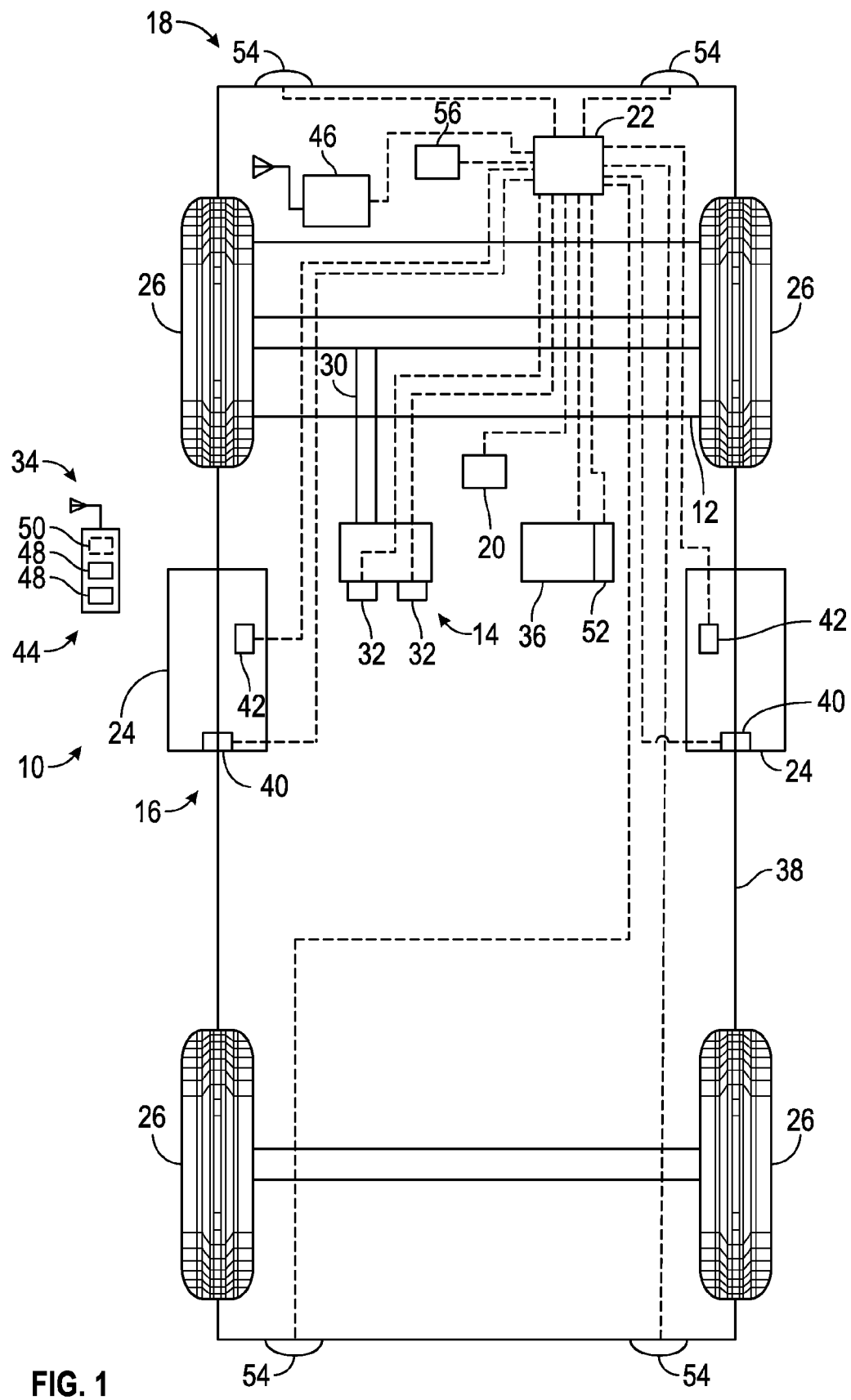
FIG. 1 is a functional block diagram illustrating a vehicle that includes a lock notification system in accordance with various embodiments.

With reference to FIG. 1, a vehicle 10 is shown. The vehicle 10 can include a powertrain 12, a steering system 14, a door lock system 16, a lock notification system 18, an ambient conditions sensor 20 and a control module 22. As will be discussed in greater detail herein, the control module 22 can receive inputs from the ambient conditions sensor 20 and the door lock system 16 to control the operation of the lock notification system 18. The lock notification system 18 can notify the operator that one or more of the doors 24 of the vehicle 10 are locked.

Generally, the vehicle 10 can include the powertrain 12 for propulsion. The powertrain 12 can include, for example, a propulsion device, including, but not limited to, an internal combustion engine, electric engine or hybrid thereof (not shown). The propulsion device can supply power through a transmission (not shown) to a suitable driveline coupled to one or more wheels (and tires) 26 of the vehicle 10 to enable the vehicle 10 to move.

The steering system 14 can include a hand wheel 28 coupled to a steering shaft 30, which can cooperate with the powertrain 12 to steer the vehicle 10. It should be noted that the use of a hand wheel is merely exemplary, as the steering system 14 can include any suitable device for steering the vehicle 10, including, but not limited to, a joystick, the hand wheel 28, etc. In this example, the hand wheel 28 can include one or more user input devices 32, which can provide an input to the control module 22. The powertrain 12 and steering system 14 are shown only in block form and without further detailed description, as embodiments of these mechanisms are varied and well known to those skilled in the art.

The door lock system 16 can include the doors 24, a remote keyless entry (RKE) system 34 and a display 36. The doors 24 can be coupled to a body 38 of the vehicle 10, and can permit ingress and egress from a cabin defined by the body 38 of the vehicle 10 as well known to those skilled in the art. The doors 24 can include, but are not limited to, entry doors, cargo doors and lift gates. Each of the doors 24 can include a lock 40 and one or more of the doors 24 can include a manual lock actuator 42. The lock 40 can be any suitable mechanism, including, but not limited to, a mechanical device or an electrical device, suitable for securing the door 24 to the body 38 to prevent access to the cabin of the vehicle 10.

The manual lock actuator 42 can comprise any suitable user input device, which can be in communication with the control module 22. In one example, the manual lock actuator 42 can comprise a mechanical knob or post coupled to one or more of the doors 24 that can be manipulated to enable an operator to send a signal to the control module 22 to lock or unlock the doors 24. In another example, the manual lock actuator 42 can comprise an electric switch coupled to one or more of the doors 24 that can be actuated to enable an operator to send a signal to the control module 22 to lock or unlock the doors 24. As a further example, one or more of the doors 24 can include both a mechanical knob or post and an electric switch, and thus, multiple lock actuators 42 can be employed on one or more of the doors 24. Further, the manual lock actuator 42 need not be coupled directly to one or more of the doors 24, but could be coupled to a console associated with the vehicle 10. It should be noted that the manual lock actuator 42 is optional, as other techniques can be used to send a signal to the control module 22 to lock or unlock one or more of the doors 24.

For example, the RKE system 34 can be used to send a signal to the control module 22 to actuate one or more of the locks 40. In one example, the RKE system 34 can include a fob 44 and a receiver 46 as known to one skilled in the art. In one example, the fob 44 can include one or more user input devices 48 and a transmitter 50. In the case of an "active" RKE system 34, the user input devices 48 can be actuated by an operator to generate a signal to lock or unlock one or more of the doors 24 of the vehicle 10. The signals generated by the actuation of the user input devices 48 can be transmitted by the transmitter 50 over a suitable wireless link to the receiver 46. Alternatively, in the case of a "passive" RKE system 34, the transmitter 50 can transmit a signal to the receiver 46 when the fob 44 has left a predetermined zone associated with the vehicle 10. For example, the transmitter 50 can transmit a signal when the fob 44 is about 15 feet away from the vehicle 10. The receiver 46 can receive the signals from the transmitter 50 of the fob 44. The receiver 46 can be in communication with the control module 22 to provide the signals received from the transmitter 50 to the control module 22.

The display 36 can be in communication with the control module 22 and can provide visual information to the driver and/or other users of the vehicle 10. In one example, the display 36 can be implemented as a flat panel display in an instrument panel or console of the vehicle 10. Those skilled in the art realize other techniques to implement the display 36 in the vehicle 10. The display 36 can include a user input device 52, which can receive inputs from the user to adjust a setting of the lock notification system 18. The user input device 52 may be implemented as a keyboard (not separately shown), a microphone (not separately shown), a touchscreen layer associated with the display 36, or other suitable device to receive data and/or commands from the user. Of course, multiple input devices 52 can also be utilized.

The lock notification system 18 can notify the operator that the doors 24 have been locked or unlocked. The lock notification system 18 can include one or more visual indicators 54 and an audible device 56. The visual indicators 54 can visually indicate that one or more of the doors 24 are locked or unlocked. In one example, the visual indicators 54 can include, but are not limited to, the headlights and taillights of the vehicle 10, however, the visual indicators 54 could comprise separate visual indicators located on the exterior or within the interior of the vehicle 10 that can indicate that one or more of the doors 24 are locked or unlocked. The audible device 56 can provide an audible indication that one or more of the doors 24 are locked or unlocked. In one example, the audible device 56 can include, but is not limited to, a horn associated with the vehicle 10.

The ambient conditions sensor 20 can be coupled to the vehicle 10 so as to observe the ambient lighting conditions surrounding the vehicle 10. In one example, the ambient conditions sensor 20 can include a light sensor, which can measure the amount of light surrounding the vehicle 10 and can generate signals based thereon. For example, the ambient conditions sensor 20 can measure the amount of daylight the vehicle 10 is exposed to and can generate signals that indicate if the vehicle 10 is in daylight conditions and/or reduced lighting conditions (twilight or darkness). In certain implementations, the ambient conditions sensor 20 can also generate signals that the vehicle 10 is in daylight conditions, twilight conditions or nighttime conditions (darkness).

The control module 22 can control the lock notification system 18 based on signals received from the user input devices 32, 52, the RKE system 34, the manual lock actuator 42 and/or ambient conditions sensor 20 to vary the notification to the operator that one or more of the doors 24 are locked. In one example, the control module 22 can control the output of one or more of the visual indicators 54 and the audible device 56 based on signals received from the user input devices 32, 52, the RKE system 34, the manual lock actuator 42 and/or ambient conditions sensor 20. It should be noted that the control module 22 can be in communication with the one or more visual indicators 54, audible device 56, user input devices 32, 52, RKE system 34, manual lock actuator 42 and ambient conditions sensor 20 over a communication bus, such as a data bus, associated with the vehicle 10. The control module 22 can receive inputs from the user input devices 32, 52, RKE system 34, manual lock actuator 42 and ambient conditions sensor 20 and can set outputs for the one or more visual indicators 54 and audible device 56 over the communication bus.

Figure 2:
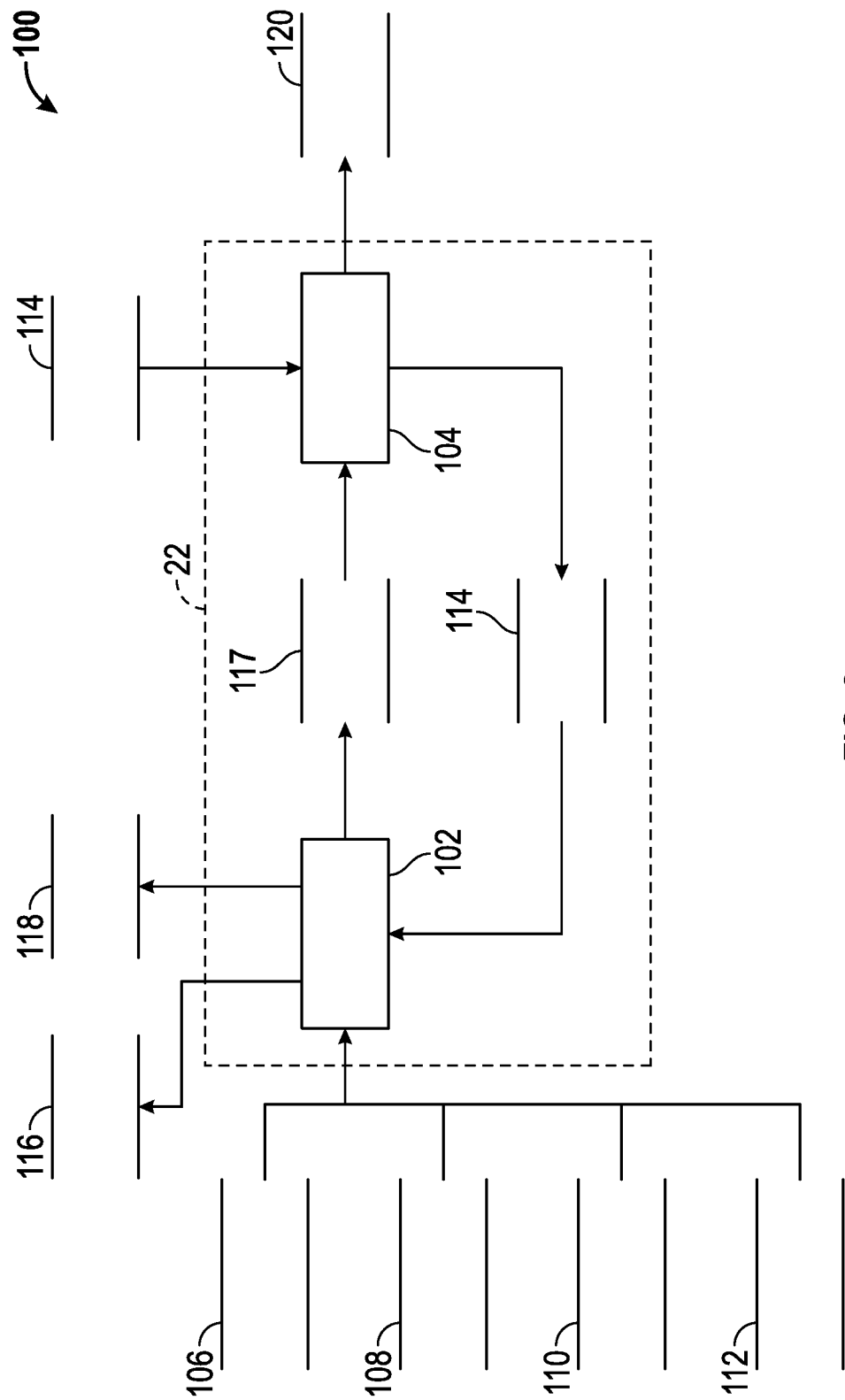
FIG. 2 is a dataflow diagram illustrating a control system of the lock notification system in accordance with various embodiments.

Referring now to FIG. 2, a dataflow diagram illustrates various embodiments of a door lock notification control system 100 for the lock notification system 18 (FIG. 1) that may be embedded within the control module 22. Various embodiments of door lock notification control system according to the present disclosure can include any number of sub-modules embedded within the control module 22. As can be appreciated, the sub-modules shown in FIG. 2 can be combined and/or further partitioned to similarly adjust the output of the lock notification system 18 (FIG. 1). Inputs to the system may be sensed from the vehicle 10 (FIG. 1), received from other control modules (not shown), and/or determined/modeled by other sub-modules (not shown) within the control module 22. In various embodiments, the control module 22 can include a lock notification control module 102 and a user interface (UI) control module 104.

The lock notification control module 102 can receive as input ambient data 106, default data 108, lock data 110, time data 112 and user input data 114. The ambient data 106 can comprise an amount of daylight measured or determined by the ambient conditions sensor 20. The default data 108 can comprise a default setting for the control of the lock notification system 18, which can be stored in a memory associated with the control module 22, or received from other modules associated with the vehicle 10. The lock data 110 can comprise data that indicates that the lock 40 of one or more doors 24 has been locked, based on a request or input received from at least one of the manual lock actuator 42 or the fob 44. The time data 112 can comprise a predetermined time of day value, which can be received from other modules of the vehicle 10. The user input data 114 can comprise input received through the user input devices 32, 52, which can comprise a setting for the control of the lock notification system 18.

Based on the ambient data 106, default data 108, lock data 110, time data 112 and user input data 114, the lock notification control module 102 can access a look-up table or a calibration table, for example, and based on the received inputs, set setting data 117 for the UI control module 104, and can output visual data 116 and audible data 118. The setting data 117 can comprise a current setting for the lock notification system 18 based on the user input data 114 or the default data 108. The visual data 116 can comprise a signal to activate the visual indicators 54 to indicate that at least one of the doors 24 is locked. The audible data 118 can comprise a signal to activate the audible device 56 to indicate that at least one of the doors 24 is locked.

The UI control module 104 can receive as input the user input data 114 and the setting data 117. Based on the user input data 114 and setting data 117, the UI control module 104 can access a look-up table or a calibration table, for example, and can output a UI 120. The UI 120 can display one or more available settings for the lock notification system 18, which can be displayed in a textual format, graphical format or combinations thereof. For example, the UI 120 could comprise a list of the available settings, such as "Horn Sound on Door Lock," "Horn Sound and Lights Flash on Door Lock," "Lights Flash on Door Lock," "No Notification of Door Lock," "Horn Sound or Lights Flash Based on Ambient Conditions," or "Horn Sound and Lights Flash or Lights Flash Only Based on Ambient Conditions." The user can then select, using the user input device 32 and/or user input device 52 a desired setting for the operation of the lock notification system 18. The selected setting can be displayed on the UI 120 and/or the default data 108 can be displayed on the UI 120 to enable the operator to observe the selected setting for the lock notification system 18. It should be noted that the UI 120 is merely exemplary, as the setting for the lock notification system 18 could comprise a default setting that is not adjustable through user input.

Figure 3:
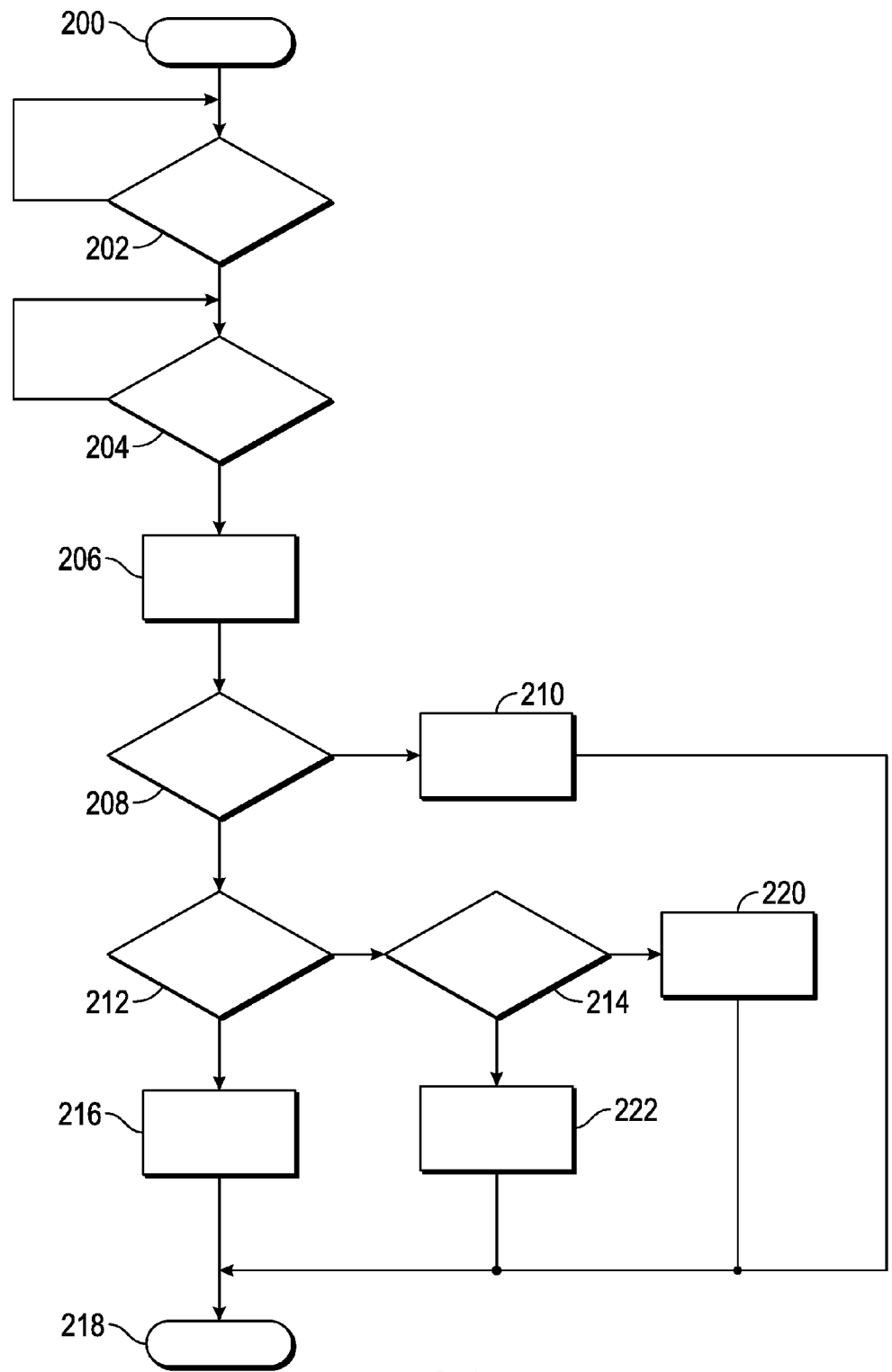
FIG. 3 is a flowchart illustrating a control method of the lock notification system in accordance with various embodiments.

Referring now to FIG. 3, and with continued reference to FIGS. 1 and 2, a flowchart illustrates a control method that can be performed by the control module 22 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or can run continually during operation of the vehicle 10.

The method can begin at 200. At 202, the method can determine if a request has been received to notify the operator that at least one of the doors 24 is locked based on ambient conditions as received from the user input data 114 or default data 108. If a request has been received to notify the operator based on ambient conditions, the method can go to 204. Otherwise, the method can loop.

At 204, the method can determine if a lock request has been received from the fob 44 or the manual lock actuator 42, and if one or more of the doors 24 has been locked. If the lock 40 of one or more of the doors 24 has been locked, the method goes to 206. Otherwise, the method loops at 204. At 206, the method can determine the ambient conditions based on the ambient data 106 received from the ambient conditions sensor 20. At 208, the method can determine if the vehicle 10 is in daylight, such that the visual indicators 54 would be substantially inefficient or unable to notify the operator that one or more of the doors 24 are locked. If the vehicle 10 is in daylight, then at 210, the method outputs audible data 118 to the audible device 56 to audibly indicate that one or more of the doors 24 are locked, or the method outputs audible data 118 to the audible device 56 and visual data 116 to at least one of the visual indicators 54 to both audibly and visibly indicate that one or more of the doors 24 are locked based on the user input data 114. Then, the method can end at 218.

Otherwise, at 212, the method determines if the vehicle 10 is in reduced ambient light, such as at dusk, night or within an enclosed parking structure. If the method determines that the vehicle 10 is in reduced ambient light, then the method can go to 214. Otherwise, the method can flag an error with the ambient conditions sensor 20 at 216 and can end at 218.

At 214, the method can determine if the vehicle 10 is in twilight based on ambient data 106 and/or the time data 112. If based on the ambient data 106 and/or the time data 112 the method determines the vehicle 10 is in twilight, such that the visual indicators 54 may not be substantially effective to notify the operator that one or more of the doors 24 are locked, the method can go to 220. At 220, the method can output visual data 116 and audible data 118, so that the operator is notified that one or more of the doors 24 are locked through both output by the audible device 56 and at least one of the visual indicators 54. It should be noted that alternatively, the method could output only the audible data 118, if desired. As a further alternative, based on the ambient data 106, the method could employ a time delay to ensure that the visual data 116 is sufficient to notify the operator that one or more of the doors 24 are locked. Thus, if the ambient data 106 indicates that the vehicle 10 is in reduced lighting conditions, such as twilight, both audible data 118 and visual data 116 can be output for a specified period of time after the ambient conditions sensor 20 observes that the vehicle 10 is twilight, such as about 30 minutes. Then, the method can end.

If at 214, the method determines that the vehicle 10 is not in twilight, but rather is in low or no ambient lighting, such as at night, wherein the visual indicators 54 would be substantially effective to notify the operator that one or more of the doors 24 are locked, the method can go to 222. At 222, the method can output visual data 116 such that the operator is notified that one or more of the doors 24 are locked with at least one of the visual indicators 54. This can enable the operator to be notified that one or more of the doors 24 are locked without disturbing those in the proximity of the vehicle 10. Then, the method can end.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A lock notification system for a vehicle having a cabin, comprising:

a door coupled to the cabin and including a lock that is actuatable to secure the door to the cabin;

an input device in the vehicle that receives a setting for the lock notification system;

an ambient conditions sensor that generates a first signal that indicates an amount of light surrounding the vehicle; and a control module that receives the first signal and a request to actuate the lock, and based on the first signal, the request to actuate the lock and the setting, the control module:

outputs only audible data to indicate that the lock is locked when the vehicle is in daylight;

outputs visual data and audible data for a specified period of time after the vehicle is observed to be in twilight and outputs visual data after the expiration of the specified period of time; and outputs only visual data to indicate that the lock is locked when the vehicle is in darkness.

2. The system of claim 1, wherein the audible data is a signal to activate an audible device associated with the vehicle.

3. The system of claim 1, wherein the visual data is a signal to activate one or more visual indicators associated with the vehicle.

4. The system of claim 3, wherein the one or more visual indicators further comprises one or more headlamps or tail lamps associated with the vehicle.

5. The system of claim 1, wherein the request to actuate the lock is received from a remote keyless entry system.

6. The system of claim 1, wherein the request to actuate the lock is received from a user input to a fob associated with a remote keyless entry system of the vehicle.

7. The system of claim 1, wherein the request to actuate the lock is received from a manual lock actuator.

8. A vehicle including a lock notification system, the vehicle comprising:
- a cabin including a door, the door having a lock that is actuatable to lock the door to the cabin;
- a remote keyless entry system that generates a first signal to actuate the lock;
- an input device in the vehicle that receives a setting for the lock notification system;
- an ambient conditions sensor that generates a second signal that indicates an amount of light surrounding the vehicle; and
- a control module that receives the first signal, the second signal and the setting, and based on the first signal, the second signal and the setting, the control module:
  - outputs only audible data to indicate that the lock is locked when the vehicle is in daylight;
  - outputs only visual data to indicate that the lock is locked when the vehicle is in darkness; and
  - outputs visual data and audible data for a specified period of time after the vehicle is observed to be in twilight and outputs only visual data after the expiration of the specified period of time.

9. The vehicle of claim 8, wherein the remote keyless entry system includes a fob, and the first signal is generated by user input to the fob.

10. The vehicle of claim 8, wherein the audible data is a signal to activate an audible device associated with the vehicle.

11. The vehicle of claim 8, wherein the visual data is a signal to activate one or more visual indicators associated with the vehicle.

12. The vehicle of claim 8, wherein the one or more visual indicators further comprises one or more headlamps or tail lamps associated with the vehicle.

13. A method of notifying that a door of a vehicle is secured to a cabin of the vehicle, comprising:
- receiving a request to lock a lock associated with the door;
- receiving a setting for a lock notification system from an input device in the vehicle;
- determining an ambient lighting condition associated with the vehicle;
- based on the setting and the ambient lighting condition indicating daylight, outputting visual data and audible data to indicate that the door is locked; and
- based on the setting and the ambient lighting condition indicating twilight:
  - outputting audible data and visible data for a specified period of time after the vehicle is observed to be in twilight; and
  - outputting visible data after the expiration of the specified period of time.

14. The method of claim 13, further comprising:
outputting only visible data if the vehicle is in darkness.

15. The method of claim 13, wherein outputting audible data further comprises:
outputting a signal to activate a horn associated with the vehicle.

16. The method of claim 13, wherein outputting visual data further comprises:
outputting a signal to activate at least one of a headlamp and a tail lamp associated with the vehicle.

17. The method of claim 13, wherein receiving the request to lock the lock associated with the door further comprises:
receiving a signal from a remote keyless entry system associated with the vehicle.

* * * * *